(12) United States Patent
Lang et al.

(10) Patent No.: US 7,165,078 B2
(45) Date of Patent: Jan. 16, 2007

(54) COLLABORATIVE DATA CLEANSING

(75) Inventors: Stefan Dieter Lang, Oftersheim (DE); Willi Alexander Rausch, Kraichtal (DE)

(73) Assignee: SAP Aktiengesellschaft, Walldorf (DE)

( * ) Notice: Subject to any disclaimer, the term of this patent is extended or adjusted under 35 U.S.C. 154(b) by 424 days.

(21) Appl. No.: 10/158,215

(22) Filed: May 31, 2002

(65) Prior Publication Data

US 2003/0225770 A1 Dec. 4, 2003

(51) Int. Cl.
G06F 17/30 (2006.01)

(52) U.S. Cl. .................... 707/201; 707/101; 707/102; 707/205

(58) Field of Classification Search ..... 707/100–104.1, 707/200–205
See application file for complete search history.

(56) References Cited

U.S. PATENT DOCUMENTS

| | | | |
|---|---|---|---|
| 5,838,965 A | | 11/1998 | Kavanagh et al. |
| 5,970,490 A | | 10/1999 | Morgenstern |
| 6,035,300 A | | 3/2000 | Cason et al. |
| 6,324,492 B1 | * | 11/2001 | Rowe .................... 709/203 |
| 6,324,541 B1 | | 11/2001 | de l'Etraz et al. |
| 6,363,393 B1 | | 3/2002 | Ribitzky |
| 6,381,601 B1 | * | 4/2002 | Fujiwara et al. ............ 707/7 |
| 6,748,402 B1 | * | 6/2004 | Reeves et al. ............ 707/201 |
| 2002/0133504 A1 | | 9/2002 | Vlahos et al. |
| 2003/0144938 A1 | | 7/2003 | Lahre et al. |

OTHER PUBLICATIONS

Garcia, M. et al.; "Immunization Registries DeDuplication and Record Matching"; A White Paper: Immunization Registries DeDuplication and Record Matching; pp. 1-11; (1999).
Anonymous, "Oracle Warehouse Builder: A Technical Overview" *An Oracle Technical White Paper*, Feb. 2000, 21 pages.
Georgakopoulos et al, "An Overview of Workflow Management: From Process Modeling to Workflow Automation Infrastructure" *Distributed and Parallel Databases*, 1995, vol. 3, pp. 119-153.
Rahm et al. "Data Cleaning: Problems and Current Approaches" *Quarterly Bulletin of the Computer Society of the IEEE Technical Committee on Data Engineering*, Dec. 2000, 11 pages.
Whalen et al. "Linking Client Records from Substance Abuse, Mental Health and Medicaid State Agencies" [Retrieved from the Internet at http://csat.samhsa.gov/idbse/linking.pdf , dated Jul. 2001, 40 pages.

* cited by examiner

*Primary Examiner*—Jean M. Corrielus
*Assistant Examiner*—Isaac Woo
(74) *Attorney, Agent, or Firm*—Fish & Richardson P.C.

(57) ABSTRACT

Collaborative data cleansing involves using two or more computer systems for merging two data objects by copying one or more attribute values associated with one a source object to a target data object and reassigning any instances that refer to the source object to the target object. The computer systems involved in the collaborative data cleansing exchange messages concerning the local status of the data cleansing cases.

26 Claims, 8 Drawing Sheets

COLLABORATIVE DATA CLEANSING

TECHNICAL FIELD

This description relates to techniques for data management.

BACKGROUND

A database, such as relational database or an object-oriented database, or an other type of data management system may be used for the administration of data processed by a computer system running one or more application programs. Some data in the data management system may be incorrect because data is duplicated in the data management system. Data may be duplicated when two or more identical records exist in the data management system, when two or more records that represent the same entity exist in a data management system in which only one record for a particular entity is permitted, or when two records exist that incorrectly represent the same entity or event even when the records are not identical and more than one record for a particular entity or event is permitted. Duplicated data or incorrect data may be removed from the data management system to improve the accuracy of the data stored.

Data also may be duplicated when two or more identical records exist in different data management systems or when two records existing in different data management systems incorrectly represent the same entity or event even when the records are not identical. Duplicated data or incorrect data may be removed from one of the data management systems to improve the accuracy of the data stored.

SUMMARY

Techniques are provided to permit multiple users to collaborate in the cleansing of data maintained on two computer systems. In one general aspect, the techniques permit different users using different computer systems to participate in the data cleansing process in turn.

In one general aspect, when data is maintained at two computer systems, a first computer system receives a data cleansing case associating a source instance of a data element having one or more associated attribute values with a target instance of a data element. The first computer system permits a user at the first computer system to process the cleansing case. Processing a cleansing case includes permitting the user to identify one or more attribute values associated with the source instance that are to be associated with the target instance and associate the identified attribute values with the target instance. After the first user processes the cleansing case, the second computer system permits a user at the second computer system to process the cleansing case.

Implementations may include one or more of the following features. For example, the first computer system may send the second computer system a blocking message that identifies the cleansing case. The first computer system may send to the second computer system a cleansing-result message that identifies the cleansing case to be unblocked. Processing a cleansing case may include displaying the source instance and the target instance associated with the cleansing case. The user at the first computer system may be the same user as the user at the second computer system. A source identification key for the source instance and a target identification key for the target instance may be received.

Processing a cleansing case may include additional features, for example, the source identification key may be used to access source data structure information identifying one or more data elements relating to the source instance and one or more attribute values associated with the source instance. The target identification key may be used to access target data structure information identifying one or more data elements relating to the target instance and one or more attribute values associated with the target instance.

An indication as to whether an attribute value associated with the source instance is identical to a corresponding attribute value associated with the target instance maybe displayed.

When a source instance has one or more subcomponents and each subcomponent has one or more associated attribute values, a subcomponent of the source instance may be displayed. An indication that the displayed subcomponent of the source instance is to be associated with the target instance may be received, and the identified subcomponent may be associated with the target instance. When a target instance also has one or more subcomponents and each subcomponent has one or more associated attribute values, at least one attribute value associated with the subcomponent of the source instance and at least one attribute value associated with the subcomponent of the target instance are displayed. An indication that identifies at least one attribute value associated with the subcomponent of the source instance that is to be associated with the subcomponent of the target instance may be received. The identified attribute values may be associated with the subcomponent of the target instance.

A target list may be associated with at least one source instance and at least one target instance. Identifying information for each source instance and each target instance associated with the target list may be displayed. An indication may be received that identifies a source instance and a target instance to be displayed.

Implementations of the techniques discussed above may include a method or process, an apparatus or system, or computer software on a computer-accessible medium.

The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

Figure 1:
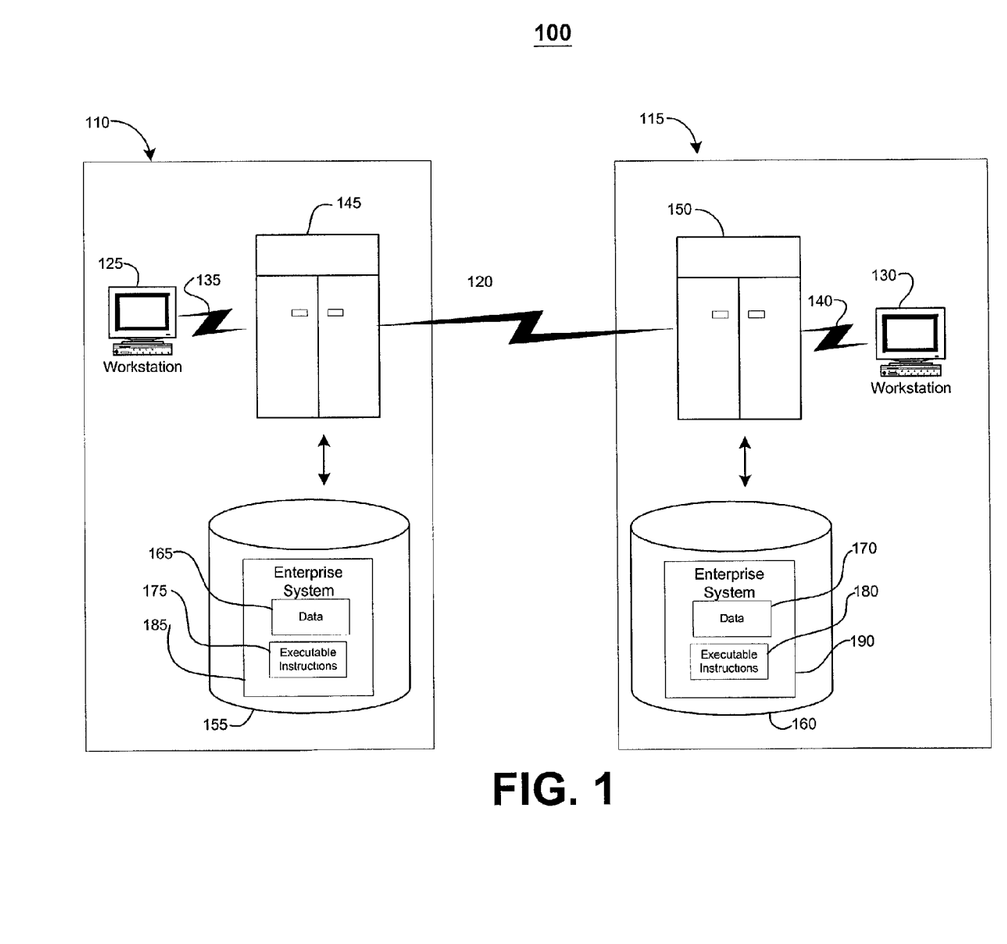
FIG. 1 is a block diagram of a system for collaborative data cleansing.

FIG. 1 shows a block diagram of a system 100 that may be used to perform collaborative data cleansing of data maintained in two or more computer systems 110 and 115. Computer systems 110 and 115 are capable of delivering and exchanging data through a communications link 120.

Each of the computer systems 110 and 115 includes a collaborative data cleansing workstation 125 and 130 connected through a communication pathway 135 or 140 to an enterprise server 145 or 150. A workstation 125 or 130 and an enterprise server 145 or 150 may be arranged to operate within or in concert with one or more other systems, such as, for example, one or more LANs ("Local Area Networks") and/or one or more WANs ("Wide Area Networks").

A workstation 125 or 130 may be a general-purpose computer that is programmed to operate as a collaborative data cleansing workstation (e.g., a desktop personal computer, workstation, or a laptop computer running an extension workbench application program), or a more special-purpose computer (e.g., a device specifically programmed to operate as a collaborative data cleansing workstation).

An enterprise server 145 or 150 includes a data storage device 155 or 160. Each of the data storage devices 155 and 160 includes data 165 or 170 and executable instructions 175 or 180 for an enterprise system 185 or 190.

A system administrator for enterprise system 185 may use collaborative data cleansing workstation 125 to cleanse data 165 that is duplicated or otherwise incorrect in data storage device 155 and associated with enterprise system 185. Similarly, a system administrator for enterprise system 190 may use collaborative data cleansing workstation 130 to cleanse data 170 that is duplicated or otherwise incorrect in data storage device 160 and associated with enterprise system 190. A system administrator for enterprise system 185 may collaborate with a system administrator for enterprise system 190 to cleanse data 165 and 170 that is duplicated or otherwise incorrect both in enterprise system 185 and in enterprise system 190.

Figure 2:
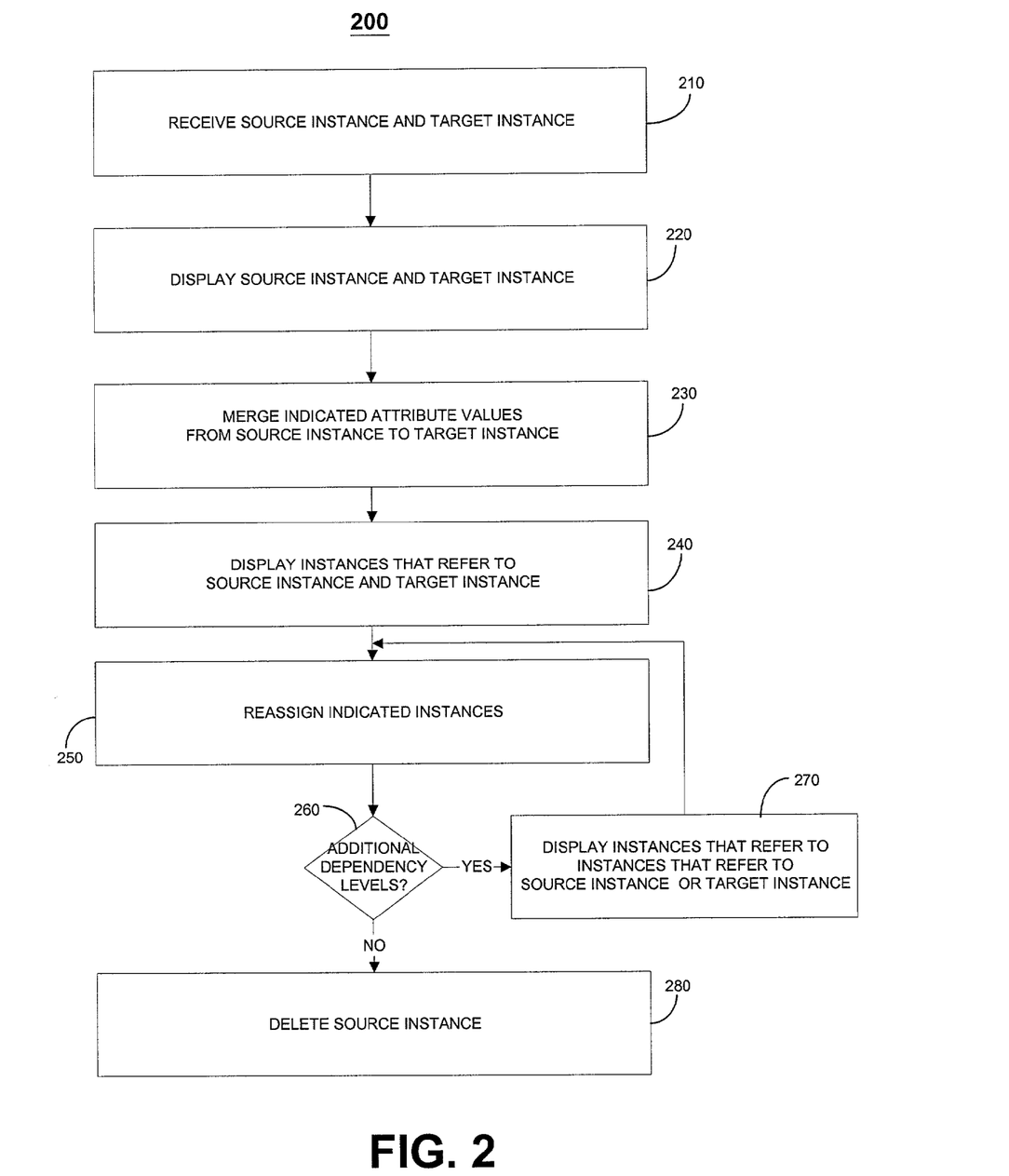
FIG. 2 is a flow chart of a data cleansing process.

Referring to FIG. 2, data stored that is duplicated or otherwise incorrect may require correction (which may be referred to as cleansing). Data that requires cleansing may be stored in an object-oriented database system that logically or physically organizes data into a series of objects (which may be referred to as an object-oriented database), a relational database, or another type of data management system. Each object may be associated with a series of attributes, and each instance of an object may be associated with a series of attribute values.

Data that requires cleansing also may be stored in a relational database system that may logically organize data into a series of database tables. A database table may arrange data associated with an entity in a series of columns and rows. Each column may describe an attribute of the entity for which data is being stored. Each row may represent a collection of attribute values for a particular entity.

Some systems may use a relational database system to store object data that may require cleansing. Data may be stored physically in one or more relational database tables and organized logically as a series of objects. Typically, a relational database table may be used to store data belonging to a particular object class, and each row in the relational database table may represent an object instance.

Data that requires cleansing also may be stored in a type of data management system that may not use a relational or object database. For example, a series of XML (Extensible Mark-up Language) documents may be used. XML is a language similar to hypertext markup language (HTML) but with the additional flexibility of being able to describe data structures that can be processed directly as data by a program.

FIGS. 2–9, for illustrative purposes, describe data involved in collaborative data cleansing as being objects. The benefits of collaborative data cleansing are not limited to that particular implementation, and are equally applicable to implementations involving other types of data management systems, such as relational database systems and XML-based systems.

FIG. 2 shows a data cleansing process 200. Data cleansing involves merging two objects (each of which may be stored as one or more records, rows, or objects) to correct data in a database, for example, by eliminating duplicate data. The objects involved in data cleansing may be considered duplicates of one another when the objects represent the same entity even when the attributes of the involved objects are not the same. Data cleansing may also be referred to as data reconciliation.

Typically, the objects involved are two instances that are duplicates of a master object class in a database. A master object class may be an object class that represents a principal entity, such as an employee, a customer, a business partner, or a product. A master object class may have a series of attributes and may be related to one or more object classes that refer to the master object class. An object that refers to another object may be called a referring object or a dependent object. For example, an instance of employee master object class may be associated with a series of attributes (such as first name, last name, and employee identification number) and may be related to two instances of a phone number referring object class (that each are associated with a particular phone number) and an instance of a work address referring object class (that is associated with address attribute values, such as street address, city, state, zip code, and country).

The cleansing process 200 begins when a processor, such as a processor within collaborative data cleansing workstation 125 or 130 in FIG. 1, receives a source instance identified as a source instance and a target instance identified as a target instance (step 210). The processor 200 deletes the source instance, may copy indicated attributes from the source instance to the target instance (which may be referred to as merging), and may reassign one or more indicated instances that refer to the source instance to refer to the target instance. The source instance and the target instance may be collectively referred to as a cleansing case, a source-target pair, or a source-target set.

The processor generates a user interface that displays the source instance and the target instance (step 220). The processor may display the source instance and the target instance in a display that allows the user to see the attribute values of each instance at the same time (which may be referred to as a split-screen display).

Using the interface, the user indicates which, if any, attribute values of the source instance are to be copied to the target instance. The processor then copies the indicated attribute values from the source instance to the target instance (step 230). This may be referred to as merging attribute values.

When the source object is associated with one or more referring object instances, the processor generates a user interface that displays one or more referring instances for the source instance and one or more referring object instances that exist for the target instance (step 240). Using the interface, the user indicates which, if any, source referring instances should be reassigned to the target instance.

The processor then reassigns the indicated referring instances from the source instance to the target instance (step 250). To do so, the processor creates a new target referring instance, copies the attribute values from the source referring instance to the new target referring instance, and deletes the source referring instance. Some implementations may reassign each indicated source referring instance in another manner, such as by modifying each source referring instance to relate to the target instance and, thus, become a target referring instance.

The processor determines whether an additional dependency level of referring instances exist for the source instance (e.g., when an instance refers to an instance that refers to the source instance) (step 260). If so, the processor displays one or more of the instances that refers to a referring instance for the source instance (step 270). The processor also may display one or more instances that refer to a referring instance for the target instance that corresponds to the displayed object type. The processor then proceeds as previously described.

If the processor determines that no additional levels of referring instances exist (step 260), the processor deletes the source instance (step 280). Some implementations may permit an instance to be modified or deleted only under particular conditions. For example, the processor may prohibit an order for merchandise from being deleted after an order has been placed. Such data integrity rules may be stored in the database system or as processing logic (or business rules) in an application program.

Figure 3:
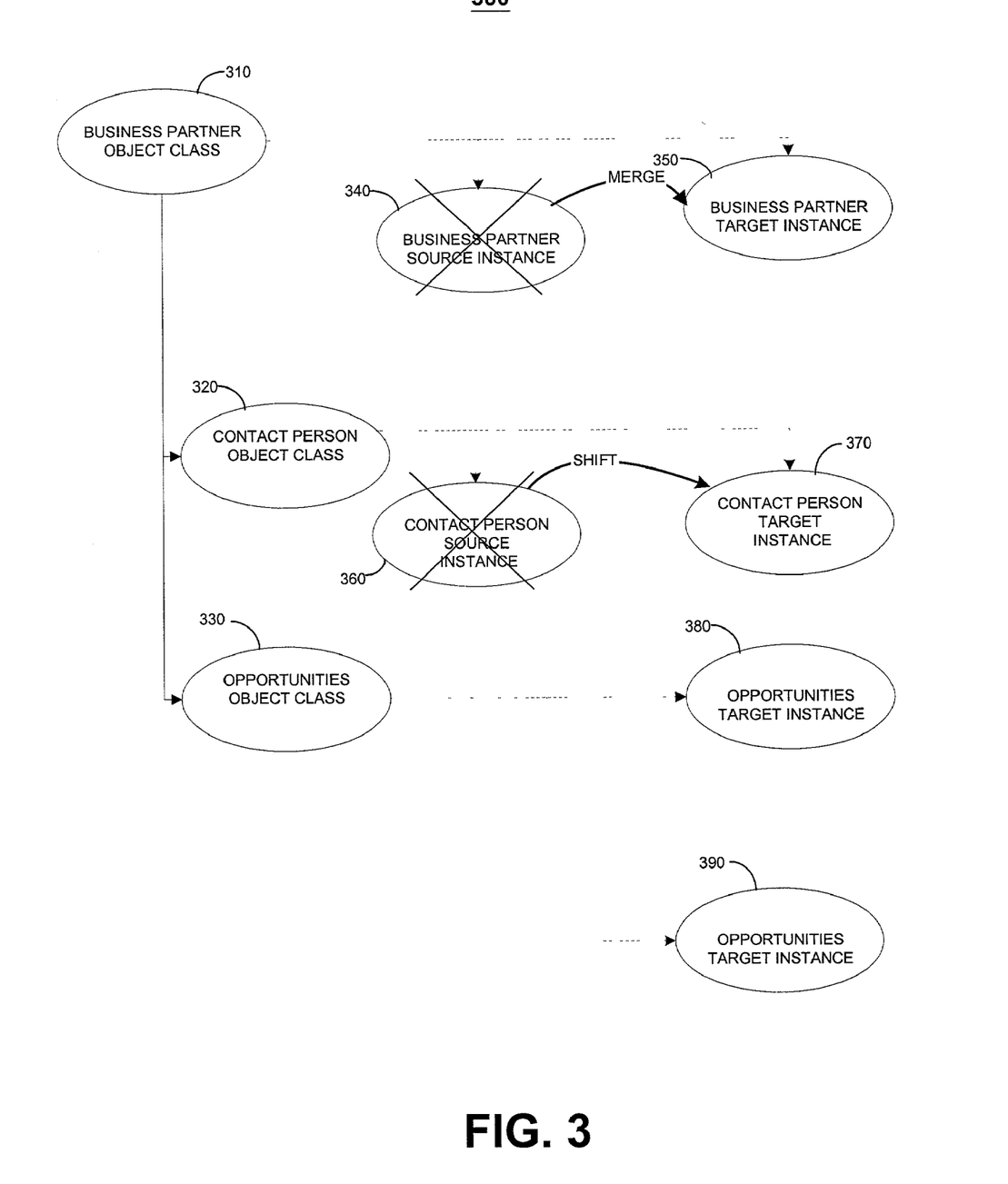
FIG. 3 is a block diagram illustrating the results of data cleansing.

FIG. 3 shows the results 300 of a data cleansing process for a business partner object class 310. The business partner object class 310 is related to contact person object class 320 and an opportunities object class 330.

Source instance 340 and target instance 350 are each instances of the business partner object class. As shown, one or more of the attribute values from source instance 340 have been merged into target instance 350, and source instance 340 has been deleted.

Contact person source instance 360 was reassigned from source instance 340 to target instance 350. In particular, contact person target instance 370 was created by copying the attributes from contact person target instance 360, and contact person source instance 360 was deleted.

No instances of the opportunities object class 330 referred to source instance 340. Opportunities target instances 380 and 390 refer to target instance 350 and, accordingly, were not modified during the cleansing process.

Figure 4:
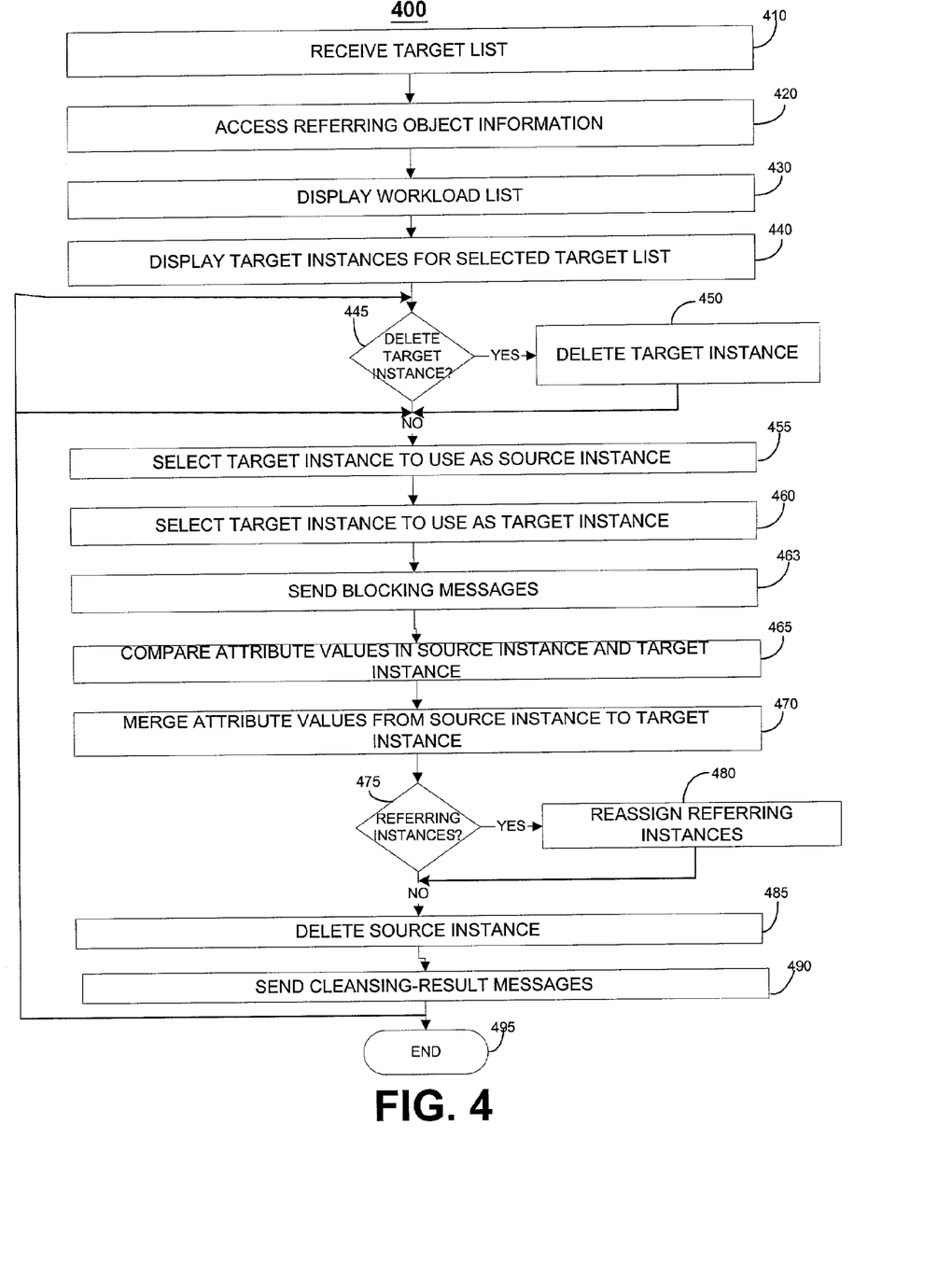
FIG. 4 is a flow chart of a collaborative data cleansing process.

FIG. 4 illustrates a collaborative data cleansing process 400. The process 400 allows two or more computer systems to process a particular cleansing case such that only one computer system at a time processes the particular cleansing case. For example, two referring instances for a source instance may be reassigned to a target instance using one computer system and a third referring instance for the same source instance may be reassigned to the same target instance using a second computer system. Techniques for using more than one computer system to process a cleansing case may be advantageous, for example, when identical data is stored in database tables on different computer systems or not all of the referring instances for a cleansing case are stored on one computer system. For example, a system administrator involved in processing a particular cleansing case to correct duplicate data on two computer systems may not have data access privileges to modify data on both computer systems as required to process the particular cleansing case.

A message is received that identifies at least two master object instances that are hypothesized to be duplicate master records (step 410). The master object instances may be stored by different data management systems. A system administrator (or other user or group of users) using a manual or automated process may have identified the hypothesized duplicate master records that are received by the collaborative data cleansing process. For example, a database administrator may use a database string search or other query function to identify master records that are similar but not identical in one or more computer systems.

The message may be referred to as a hypothesis message, the set of master object instances that are hypothesized to be duplicates may be referred to as a target list, and each master object instance may be referred to as a target instance. Unlike in the data cleansing process 200, none of the target instances on the target list are identified in the hypothesis message as a source instance. One hypothesis message may include more than one target list. The duplicate master object instances may have been identified during a data exchange process or by a process that searches for duplicates. The received message may be formatted as a XML document, one or more entries for a database table, an email message, a binary file, or a text file.

Some implementations may include attribute values for each target instance in the target list or may indicate the status of each target instance in the target list (with the status being, for example, identified as a duplicate, rejected as a duplicate, or processed). Some implementations may determine whether two target instances have identical attribute values, and, if so, identify them as duplicates and prohibit a user from indicating later that the target instances are not duplicates.

For each target instance included in the target list, the processor accesses referring object information that identifies one or more instances of dependent objects that refer to the target instance (step 420). To do so, the processor accesses a referring object electronic spreadsheet (such as one created using a version of Excel available from Microsoft Corporation) that indicates a key identifier for the target instance, text that identifies the target instance, and a key identifier (which may be referred to as a relationship key) and an object class name for each dependent object instance that refers to the target instance. The referring object electronic spreadsheet has a column for the target instance key identifier, an indication of the data management system that stores the referring object, a column for a key identifier for a dependent object instance, and a column for an object class name for a dependent object instance. The referring object electronic spreadsheet has a row for each instance that refers to a target instance in the target list. Other information (such as whether an instance may be deleted) may be stored in the referring object electronic spreadsheet. The referring object electronic spreadsheet may be received as part of the hypothesis message or received separately.

Some implementations may use other techniques for identifying instances that refer to a target instance in the target list. For example, a database table or data model repository may be accessed for referring object information. Some implementations may include attributes and attribute values as part of the referring object information.

The processor displays a list of target lists received as a workload list (that may be referred to as a cleansing stack)

to permit a user to select a target list (step 430). For each target list, the workload list may include an identification number for the target list, the object class of the target instance to be cleared (e.g., table name or table reference number), an indicator of the data management system in which the object is located, an indicator of the status of the target list (e.g., in process, new, rejected, blocked, done), a priority rating (e.g., high, normal, low), the date and time that the target list was added to the workload list, an indication of the user who is responsible for cleansing this target list, and a description of the object class to be cleansed. When the processor displays the target list in the workload list, the processor initiates a background process to determine any instances that refer to a target instance included in a target list.

When the user selects a target list, the processor then displays a list of the key identifiers for each target instance associated with the target list identified from the workload list (step 440). The display includes a source instance navigational area and a target instance navigational area. A navigational area may be referred to as a window.

In general, the user reviews the target instances (such as by reviewing attribute values of a target instance and any instance that refers to the target instance) to determine whether any target instance is a duplicate instance and, if so, which target instance is to be deleted. The user may base this decision on, for example, the relative quality of the data values in each instance, the relative quantity of dependent instances for a target instance, or whether a target has an instance that cannot be deleted. In some implementations, the user may be able to display additional information about one or more target instances listed, such as a probability value that reflects the likelihood that a pair of target instances are duplicates. The probability value may be based on the degree of identical fields found in the target instances.

The user may indicate that one or more target instances are not duplicates and may be rejected as data cleansing objects (step 445). If so, the processor then deletes the appropriate target objects from the workload (step 450).

The processor displays a target instance selected by the user from the target list in the source instance navigation area (step 455). The user may identify a target instance, for example, by dragging-and-dropping a key identifier from the target list to a particular navigation area. The processor displays the text that identifies the target instance and a list of the instances that refer to the target instance (which may be referred to as a dependency tree). The target instance displayed in the source instance navigation area may be referred to as the source instance for the cleansing case.

The processor displays a second target instance selected by the user from the target list in the target instance navigation area (step 460). The user may identify a target instance, for example, by dragging-and-dropping a key identifier from the target list to a particular navigation area. The processor displays the dependency tree for the target instance. The target instance displayed in the target instance navigation area may be referred to as the target instance for the cleansing case.

Some implementations may allow a user to replace the instance selected as the source instance with another instance in the target list before any attribute values are merged from the source instance to the target instance. Similarly, some implementations may allow a user to replace the instance selected as the source instance with another instance in the target list before any attribute values are merged from the source instance to the target instance.

The processor sends a blocking message to each computer system involved in the collaborative data cleansing process 400. The blocking message notifies the receiving computer system that the cleansing case is being processed (step 463). A computer system that receives a blocking message for a particular cleansing case is prohibited from processing the particular cleansing case until a message is received that unblocks the particular cleansing case. Each blocking message includes a key identifier for the associated cleansing case and an indication that the associated cleansing case is being processed. The blocking message may help prevent a cleansing case from being processed in the same manner more than once.

Some implementations may also prohibit any processes that use the data being cleansed until a message is received that unblocks the particular cleansing case.

The processor then presents a user interface that displays the attribute values for both the source object and the target object and allows the user to indicate which, if any, attribute values are to be merged from the source object to the target object (step 465). Some implementations may allow the user to drag-and-drop attribute values from the source object to the target object, highlight one or more attribute values to be copied from the source object to the target object, or check a checkbox or push a radio button to indicate which attribute values are to be copied. Some implementations may display attribute values in a different manner based on whether the source and target object attribute values are the same or different. For example, attribute values that are the same in the source instance and target instance for a particular attribute might be displayed in one color (e.g., green) and attribute values that are different in the source instance and target instance for a particular attribute might be displayed in another color (e.g., red). Some implementations may use an icon, such as an equal sign or unequal sign, to indicate whether the attribute values are the same or different in the source instance and the target instance.

When the user has indicated which, if any, attribute values are to be copied from the source object to the target object, the processor copies the indicated attribute values from the source object to the target object (step 470).

When one or more referring instances exist for the source instance, the user indicates which, if any, referring instances should be reassigned to the target instance (step 475). The user may so indicate by dragging-and-dropping a portion of the dependency tree from the source instance navigation area to the target instance navigation area.

All of the referring instances that have been indicated are reassigned to the target instance (step 480). When the user indicates that a referring instance is to be reassigned to the target instance, the processor creates a new referring instance that refers to the target instance, copies the attribute values from the referring instance that referred to the source instance to the new referring instance, and deletes the referring instance that referred to the source instance.

Some implementations may reassign each indicated source instance in another manner, such as by modifying each dependent source instance to relate to the target instance. Some implementations may allow a user to indicate whether a referring instance that refers to the source instance should be deleted. Some implementations may not allow a referring instance to be deleted under some conditions.

The processor then may delete the source instance (step 485). Alternatively or additionally, the process may request that the source object be deleted or archived (or may delete the source object directly). Some implementations may physically delete the source object, logically delete the source object (e.g., indicate that the object has been deleted and make the object inaccessible until the object is physically removed from the database), indicate that the source object should be archived, and/or initiate an archiving process to remove the source object from the database.

The processor sends a cleansing-result message to each computer system involved in the collaborative data cleansing process 400 that instructs the receiving computer system to unblock the identified cleansing case (step 490). Each cleansing-result message may include a key identifier for the associated cleansing case and an indication that the processing of the associated cleansing case has been completed.

Some implementations may send cleansing-result messages when the process ends (step 495) or another target list is selected from the workload list (step 430).

Based on an instruction of the user, the processor displays a target instance in the source instance navigation area (step 455) and proceeds as described previously, displays a workload list (step 430) and proceeds as described previously, or ends the data cleansing process 400 (step 495).

Some implementations may automate portions of the data cleansing process after a cleansing case has been selected. For example, the processor may shift all referring objects from the source to the target object, and may add any missing attributes to the target.

The processor determines a list of all instances of an object class by using the referring object spreadsheet or table. The processor determines a list of attributes of an object instance. Some implementations may only copy an instance under certain conditions, such as to ensure referential integrity or in a critical object (orders) that cannot be deleted. The processor may check to determine whether the instance can be reassigned before reassigning the instance.

Reassigning an instance may involve creating an instance for the target object and keeping the referring source object, creating an instance for the target object and deleting the referring source object, or keeping the instance as is but changing references to the referring source object.

Figure 5:
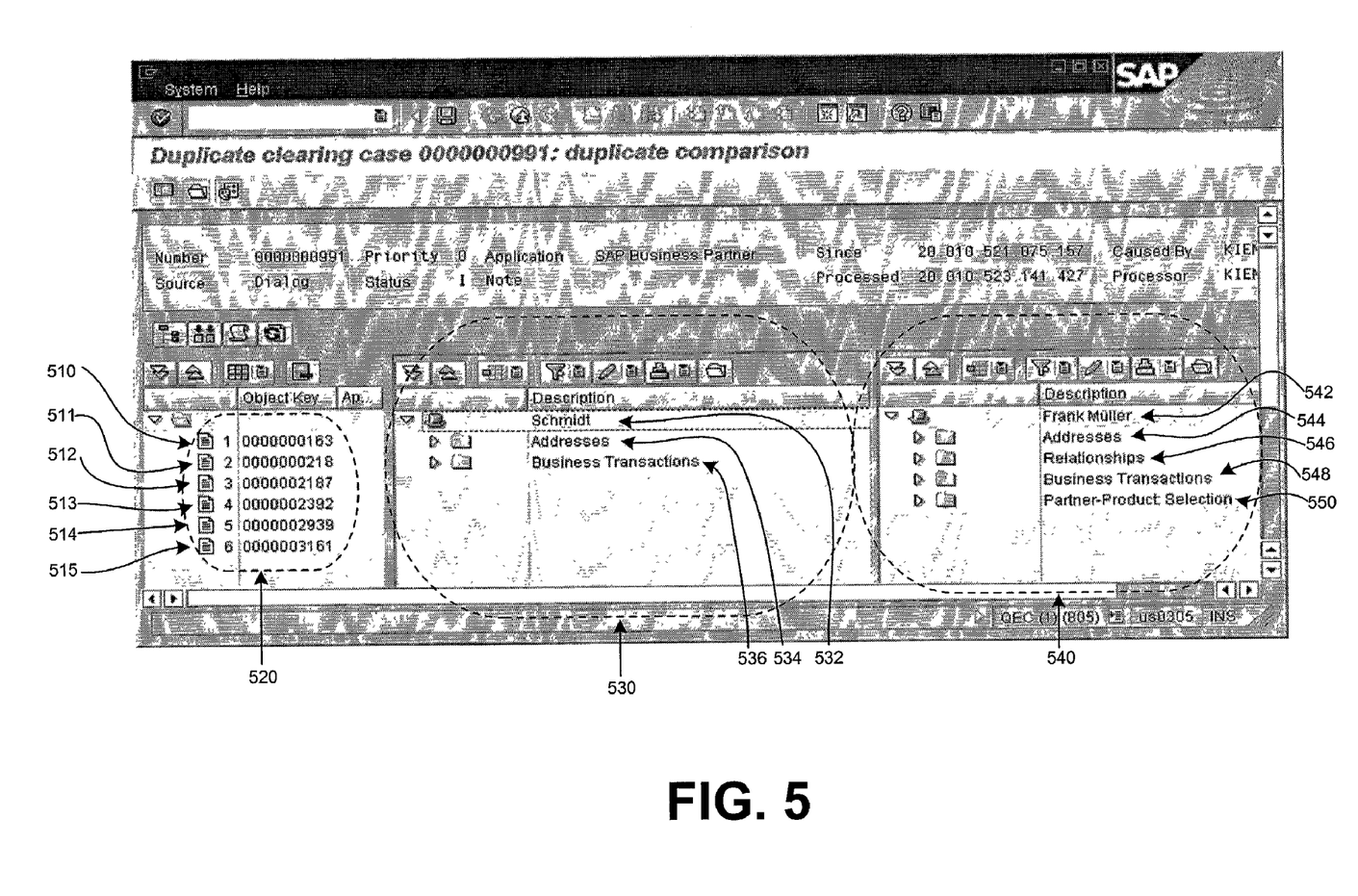
FIGS. 5 and 6 are screen captures of aspects of a data cleansing process.

FIG. 5 illustrates an exemplary list of key identifiers for target instances 510–515 of a target list 520. Source instance navigation area 530 includes the text identifying the source instance 532, an addresses object class 534 having one or more addresses instances that refer to the source instance (not shown), and a business-transactions object class 536 having one or more business-transactions instances that refer to the source instance (not shown). The text identifying the source instance 532, the addresses object class 534, and the business-transactions object class 536 collectively may be referred to as a dependency tree.

Target instance navigation area 540 includes the text identifying the target instance 542, an addresses object class 544 having one or more addresses instances that refer to the target instance (not shown), a relationships object class 546 having one or more relationships that refer to the target instance (not shown), a business-transactions object class 548 having one or more business-transaction instances that refer to the target instance (not shown), and a partner-product selection object class 550 having one or more partner-product selections that refer to the target instance (not shown).

The user may expand one or more object class in the source instance dependency tree to show undisplayed instances or object classes. Similarly, the user may collapse a portion or all of a dependency tree that has been expanded to hide referring instances or dependent object classes.

The user may display the attribute values for an instance. The user may display the attribute values for an instance that refers to the source instance and the attribute values for an instance that refers to the target instance. The two instances displayed may be of the same object class.

The user may indicate any referring instances are to be reassigned from the source instance to the target instance by dragging-and-dropping any portion of the dependency tree to the target instance navigation area 540. For example, when the addresses object class 534 is dragged-and-dropped onto the target instance navigation area, the processor reassigns to the target instance all of the addresses instances that refer to the source instance. Similarly, when the addresses object class 534 and the business-transactions object class are dragged-and-dropped onto the target instance navigation area 540, the processor reassigns to the target instance all of the addresses instances and all of the business-transactions instances that refer to the source instance. A particular instance of an addresses object that refers to the source instance may be reassigned to the target instance by expanding the addresses object class so that the addresses instances are displayed and dragging an addresses instance to the target instance navigation area 540.

Some implementations may display and allow reassignment for one or more additional levels of dependent objects. For example, the expansion of business-transactions object class 536 may display a business-transactions-contract object class and a business-transactions-contact object class, each of which has one or more instances. An instance of a business-transactions-contact object class that refers to an instance of a business-transactions class that refers to the source instance may be reassigned to the target instance.

Figure 6:
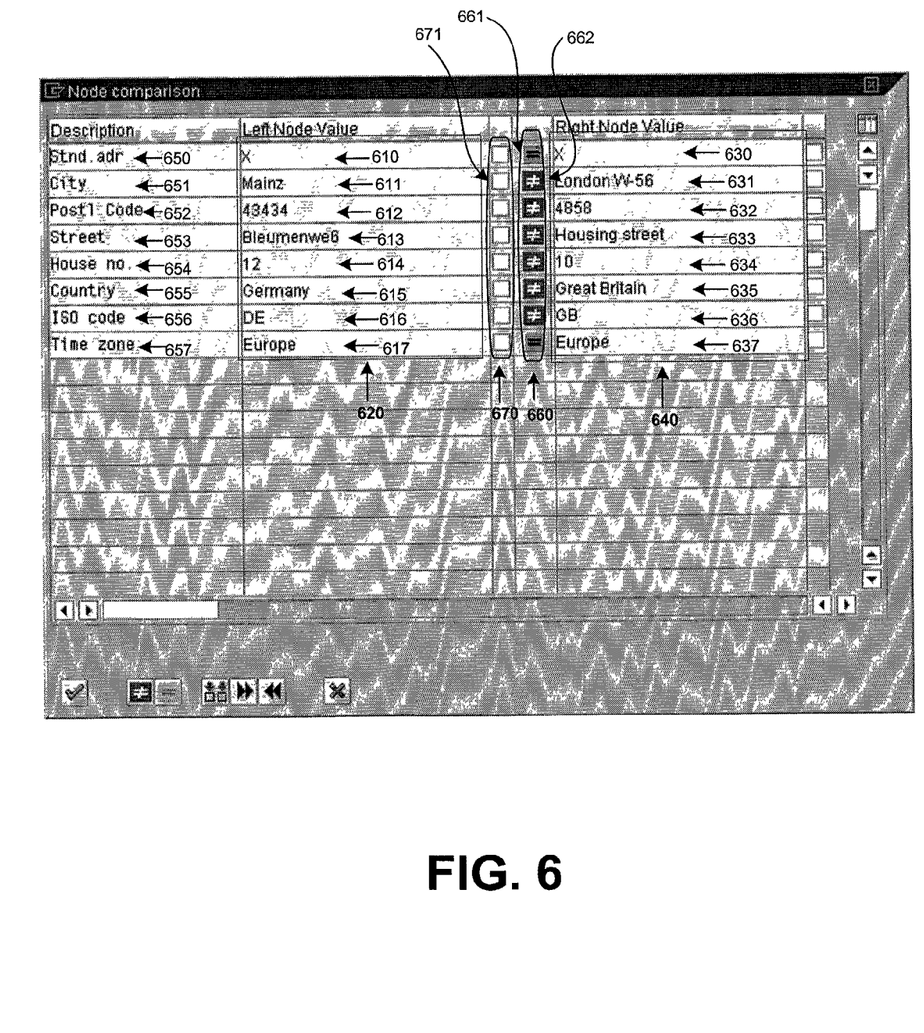

Referring to FIG. 6, attribute values 610–617 for addresses instance 620 that refers to the source instance and attribute values 630–637 for addresses instance 640 that refers to the target instance are displayed. A description 650–657 for each attribute of the object class is displayed. For example, the description "City" 651 is an attribute in the addresses object class, attribute value 611 "Mainz" is the city attribute value in the addresses instance that refers to the source instance, and the attribute value 631 "London W-56" is the city attribute value in the addresses instance that refers to the target instance. Attribute value 611 and attribute value 631 may be referred to as corresponding attribute values.

For each displayed attribute, an indication 660 is displayed as to whether the corresponding attribute values for addresses instance 620 and addresses instance 640 are equal. For example, an equal sign 661 indicates that the attribute value 610 for addresses instance 620 is the same as the attribute value 630 for addresses instance 640. Similarly, an unequal sign 662 indicates that the attribute value 611 for addresses instance 620 is not the same as the attribute value 613 for addresses instance 640.

A user may indicate that one or more particular attribute values in addresses instance 620 that refers to the source instance may be merged with addresses instance 640 that refers to the target instance by clicking in a blank square (that may represent a checkbox) in column 670 that corresponds to the attribute value to be copied from addresses instance 620 to addresses instance 640. For example, to indicate that attribute value 611 "Mainz" in addresses instance 620 should be copied to addresses instance 640, the blank checkbox 671 may be checked.

Figure 7:
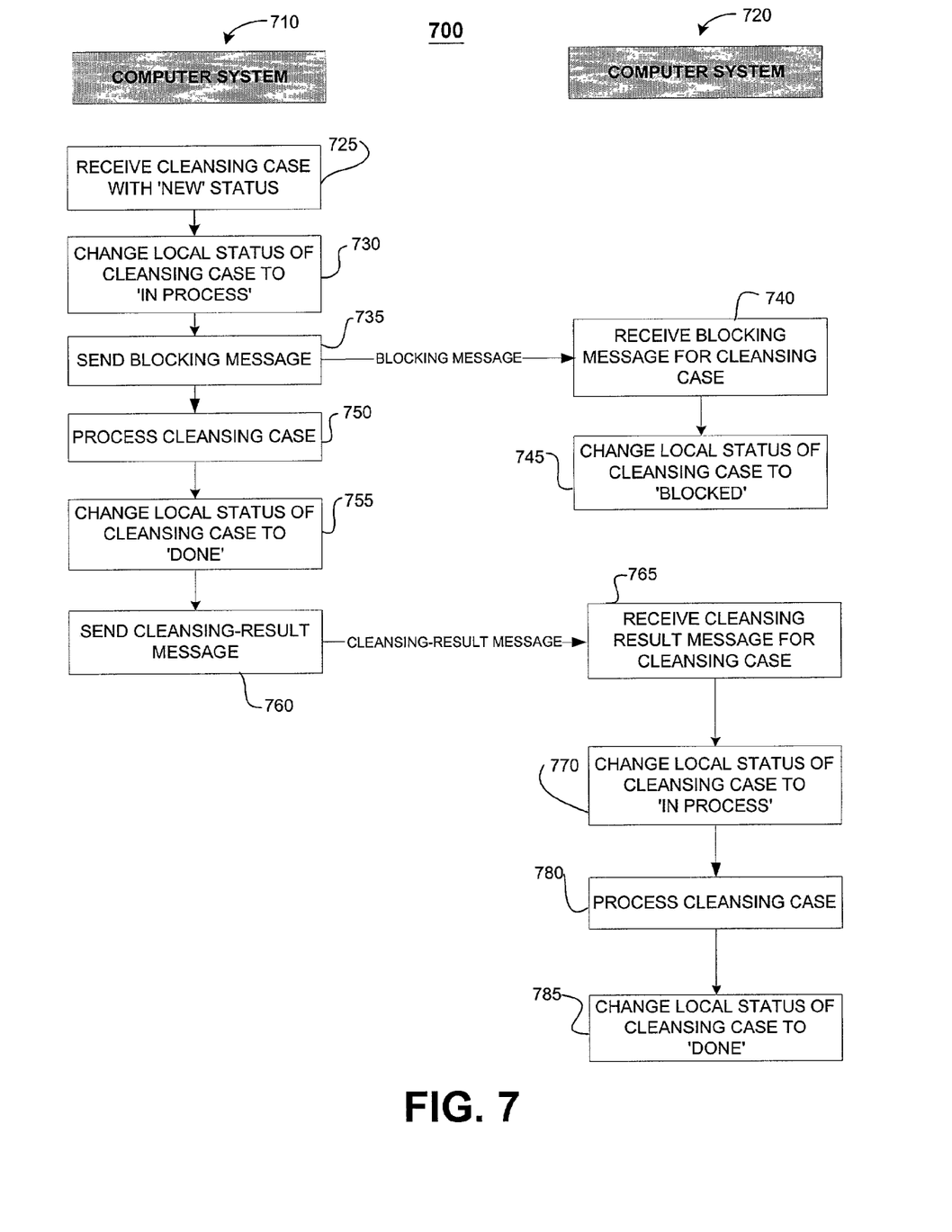
FIG. 7 is a block diagram illustrating communications between two systems used to perform collaborative data cleansing.

Referring to FIG. 7, a collaborative cleansing process 700 may be performed by two computer systems 710 and 720 that collaborate on the processing of a particular cleansing case. The process 700 begins when computer system 710 receives a cleansing case (step 725). When received, the cleansing case may have a status indicating that the cleansing case is new (e.g., that the processing for the cleansing case has not yet been started). When collaboratively processing a cleansing case, the computer systems exchange one or more messages indicating the local status for the cleansing case on the particular computer system that sent the message. The status for a cleansing case may be referred to as "local" relative to the computer system that sent the message.

Computer system 710 changes the local status for the cleansing case to indicate that the cleansing case is in process (e.g., that computer system 710 is processing the cleansing case) (step 730) and sends a blocking message to computer system 720 that indicates that the cleansing case identified in the blocking message is being processed (step 735).

Computer system 720 receives the blocking message for the cleansing case (step 740) and changes the local status of the cleansing case to "blocked" to indicate that computer system 720 is prohibited from processing the identified cleansing case (step 745). In some implementations, computer system 720 may send a message to computer system 710 to acknowledge the receipt of the blocking message.

Computer system 710 processes the cleansing case (step 750). For example, the computer system 710 may do so by merging attributes and reassigning referring instances from the source instance to the target instance. When computer system 710 has completed as much processing of the cleansing case as computer system 710 can perform, computer system 710 then changes the local status of the cleansing case to indicate that local processing is complete (e.g., done) (step 755) and sends a cleansing-result message to computer system 720 (step 760).

Computer system 720 receives the cleansing-result message for the cleansing case (step 765). When a cleansing-result message is received, computer system 720 changes the local status of the cleansing case to indicate that the cleansing case has been accepted for cleansing processing by computer system 710, and, thus, is a confirmed duplicate. In view of this status, computer system 720 may not reject the received cleansing case.

When starting to process the cleansing case, computer system 720 changes the local status of the cleansing case to indicate that the cleansing case is in process (e.g., that computer system 720 is processing the cleansing case) (step 770).

Computer system 720 then processes the cleansing case (step 780). When processing is completed, computer system 720 changes the local status of the cleansing case to indicate that local processing is complete (e.g., done) (step 785).

In some implementations, computer system 720 may send a blocking message to computer system 710 before processing the cleansing case and may send a cleansing-result message to computer system 710 after processing has been completed.

Figure 8:
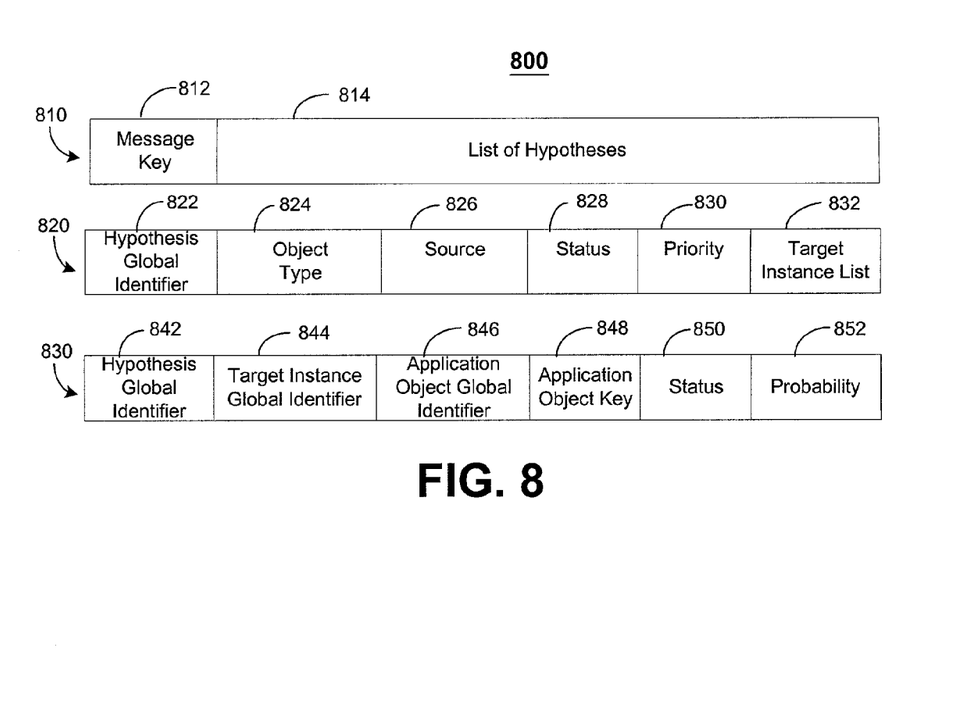
FIGS. 8 and 9 are block diagrams of data structures used in a collaborative data cleansing process.

FIG. 8 shows a data structure 800 for a hypothesis message for a collaborative data cleansing process. The illustrated implementation is an XML-based message. Hypothesis message 700 includes header 710 having general header information, such as a message identification key 712, and one or more hypotheses 714 (which also may be referred to as a list of hypotheses).

The data structure for one hypothesis 720 includes a hypothesis global identifier 772, an object type 724, a source indicator 726, a status indicator 728, a priority indicator 730, and a list of target instances 732. The hypothesis global identifier 722 uniquely identifies the hypothesis. The object type 724 identifies the master object class. The source indicator 726 identifies the manner in which the hypothesis was identified (e.g., during a data exchange or a database scan to identify duplicate objects). The status indicator 728 indicates the status of the clearing case (such as new, in process, rejected as a duplicate, done, or accepted). The priority indicator 730 indicates the priority for processing the hypothesis. The list of target instances 732 identifies the target instances included in the hypothesis.

The data structure for one target instance 740 for a hypotheses message 700 includes a hypothesis global identifier 742, a target instance global identifier 744, an optional application object global identifier 746, an application object key 748, a status indicator 750, and an optional probability indicator 752. The hypothesis global identifier 742 indicates the hypothesis to which the target instance relates. The target instance global identifier 744 uniquely identifies the target instance. The optional application object global identifier 746 uniquely identifies the target instance across the data management systems involved in collaborative data processing. The application object key 748 uniquely identifies the target instance within the data management system that stores the target instance. The status indicator 750 indicates the status of the target instance (such as whether the target instance has been identified as a source instance, a target instance, or not yet identified as a source instance or a target instance). The optional probability indicator 752 may be included when an instance has been identified as a source instance. The optional probability indicator 752 indicates the percentage of similarity between the source instance and the target instance.

Figure 9:
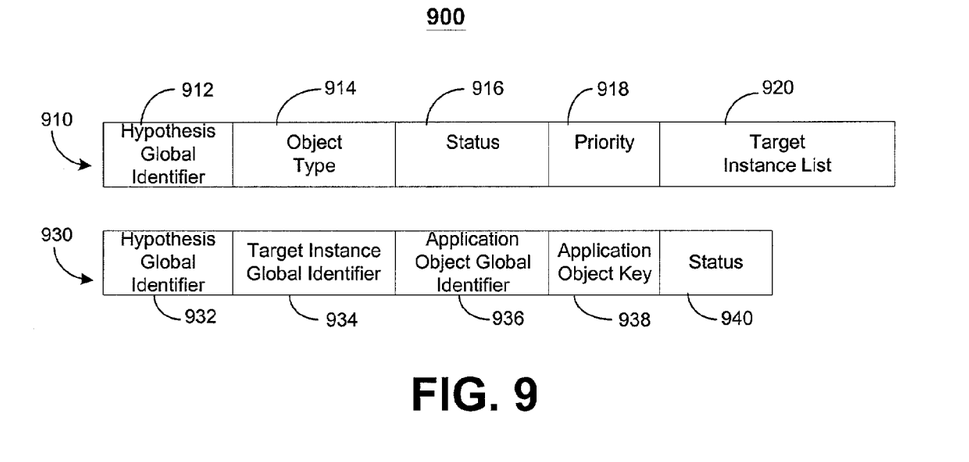

FIG. 9 shows a data structure 900 for a cleansing-result message for a collaborative data cleansing process. The illustrated implementation is a XML-based message. Cleansing-result message 800 includes a header 810 that has a hypothesis global identifier 812, an object type 814, a status indicator 816, a priority indicator 818, and list of target instances 820. The hypothesis global identifier 812 uniquely identifies the hypothesis to which the message relates. The object type 814 identifies the master object class. The status indicator 816 indicates the status of the clearing case (such as blocked by the collaborative cleansing process, rejected as a duplicate, done, accepted). The priority indicator 818 indicates the priority for processing the hypothesis. The list of target instances 820 identifies the target instances included in the hypothesis.

The data structure for one target instance 830 for a cleansing-result message 800 includes a hypothesis global identifier 832, a target instance global identifier 834, an optional application object global identifier 836, an application object key 838, and a status indicator 840. The hypothesis global identifier 832 indicates the hypothesis to which the target instance relates. The target instance global identifier 834 uniquely identifies the target instance. The optional application object global identifier 836 uniquely identifies the target instance across the data management systems involved in collaborative data processing. The application object key 838 uniquely identifies the target instance with the data management system that stores the target instance. The status indicator 840 indicates the status of the target instance (such as whether the target instance has been identified as a source instance, a target instance, or not yet identified as a source instance or a target instance).

The cleansing-result message also may be used as a blocking message (as described previously with respect to FIG. 4) to a data management system, for example, by indicating a status of blocked by the collaborative cleansing process. When a cleansing case has a status of blocked by the collaborative cleansing process, only the system that generated the blocking message may process the cleansing case.

Some implementations may provide the object data values in the received message in lieu of or in addition to the object identification information.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

The benefits from data cleansing using the techniques described are not limited to reducing the number of duplicate records and are equally applicable to other contexts. For example, these techniques may be used to transfer data in a dependent object instance to a new parent object that is not a duplicate of another the object, or to review data to determine the accuracy of the data (e.g., when the data has been received from an unreliable or untrustworthy source).

Other implementations are within the scope of the following claims.

What is claimed is:

1. A computer-implemented method for maintaining data, the method comprising:
    at a first computer system, receiving a cleansing case associating a source instance of a data data element having one or more associated attribute values with a target instance of a data element;
    sending to a second computer system a blocking message that identifies the cleansing case and indicates access to the cleansing case from the second computer system is to be blocked;
    permitting a first user at the first computer system to process the cleansing case by permitting the first user to identify one or more attribute values associated with the source instance that are to be associated with the target instance, and associate the identified attribute values with the target instance;
    after the first user processes the cleansing case, sending to the second computer system a cleansing-result message that identifies the cleansing case and indicates access to the cleansing case from the second computer system is to be permitted; and
    only after receipt of the cleansing-result message at the second computer system, permitting a second user at the second computer system to process the cleansing case by permitting the second user to identify one or more attribute values associated with the source instance that are to be associated with the target instance, and associate the identified attribute values with the target instance.

2. The method of claim 1 wherein permitting the first user at the first computer system to process the cleansing case comprises permitting the first user at the first computer system to process the cleansing case by:
    displaying the source instance associated with the cleansing case, and
    displaying the target instance associated with the cleansing case.

3. The method of claim 1 wherein the first user is the same user as the second user.

4. The method of claim 1 wherein:
    receiving a cleansing case comprises receiving a source identification key for the source instance and a target identification key for the target instance, and
    processing a cleansing case further comprises:
        using the source identification key to access source data structure information identifying one or more data elements relating to the source instance and one or more attribute values associated with the source instance; and
        using the target identification key to access target data structure information identifying one or more data elements relating to the target instance and one or more attribute values associated with the target instance.

5. The method of claim 1 wherein processing the cleansing case further comprises displaying an indication as to whether the attribute value associated with the source instance is identical to a corresponding attribute value associated with the target instance.

6. The method of claim 1, wherein:
    a source instance comprises one or more subcomponents, with each subcomponent having one or more associated attribute values, and
    processing the cleansing case further comprises:
        displaying a subcomponent of the source instance;
        receiving an indication that the displayed subcomponent of the source instance is to be associated with the target instance; and
        associating the identified subcomponent with the target instance.

7. The method of claim 6 wherein:
    a target instance comprises one or more subcomponents, with each subcomponent having one or more associated attribute values, and
    processing the cleansing case further comprises:
        displaying at least one attribute value associated with the subcomponent of the source instance and at least one attribute value associated with the subcomponent of the target instance;
        receiving an indication that identifies at least one attribute value associated with the subcomponent of the source instance that is to be associated with the subcomponent of the target instance; and
        associating the identified attribute values with the subcomponent of the target instance.

8. The method of claim 1 wherein processing the cleansing case further comprises:
    associating a target list with at least one source instance and at least one target instance;
    displaying identifying information for each source instance and each target instance associated with the target list; and
    receiving an indication that identifies a source instance and a target instance to be displayed.

9. A computer-readable storage medium having embodied thereon a computer program configured to maintain data, the medium comprising one or more code segments configured to:
    at a first computer system, receive a cleansing case associating a source instance of a data element having one or more associated attribute values with a target instance of a data element;
    send to a second computer system a blocking message that identifies the cleansing case and indicates access to the cleansing case from the second computer system is to be blocked;

permit a first user at the first computer system to process the cleansing case by permitting the first user to identify one or more attribute values associated with the source instance that are to be associated with the target instance and associate the identified attribute values with the target instance;

after the first user processes the cleansing case, send to the second computer system a cleansing-result message that identifies the cleansing case and indicates access to the cleansing case from the second computer system is to be permitted; and only after receipt of the cleansing-result message at the second computer system, permit a second user at the second computer system to process the cleansing case by permitting the second user to identify one or more attribute values associated with the source instance that are to be associated with the target instance, and associate the identified attribute values with the target instance.

10. The medium of claim 9 wherein a code segment configured to process the cleansing case is further configured to:
  display the source instance associated with the cleansing case, and
  display the target instance associated with the cleansing case.

11. The medium of claim 9 wherein the first user is the same user as the second user.

12. The medium of claim 9 wherein:
  a code segment configured to receive the cleansing case is configured to receive a source identification key for the source instance and a target identification key for the target instance, and
  a code segment configured to process the cleansing case is further configured to:
    use the source identification key to access source data structure information identifying one or more data elements relating to the source instance and one or more attribute values associated with the source instance; and
    use the target identification key to access target data structure information identifying one or more data elements relating to the target instance and one or more attribute values associated with the target instance.

13. The medium of claim 9 wherein a code segment configured to process the cleansing case is further configured to display an indication as to whether the attribute value associated with the source instance is identical to a corresponding attribute value associated with the target instance.

14. The medium of claim 9, wherein:
  a source instance comprises one or more subcomponents, with each subcomponent having one or more associated attribute values, and
  the code segment configured to process the cleansing case is further configured to:
  display a subcomponent of the source instance;
  receive an indication that the displayed subcomponent of the source instance is to be associated with the target instance; and
  associate the identified subcomponent with the target instance.

15. The medium of claim 14, wherein:
  a target instance comprises one or more subcomponents, with each subcomponent having one or more associated attribute values, and
  a code segment configured to process the cleansing case is further configured to:
    display at least one attribute value associated with the subcomponent of the source instance and at least one attribute value associated with the subcomponent of the target instance;
    receive an indication that identifies at least one attribute value associated with the subcomponent of the source instance that is to be associated with the subcomponent of the target instance; and
    associate the identified attribute values with the subcomponent of the target instance.

16. The medium of claim 9, wherein a code segment configured to process the cleansing case is further configured to:
  associate a target list with at least one source instance and at least one target instance;
  display identifying information for each source instance and each target instance associated with the target list; and
  receive an indication that identifies a source instance and a target instance to be displayed.

17. A system for maintaining data, the system comprising a processor connected to a storage device and one or more input/output devices, wherein the processor is configured to:
  at a first computer system, receive a cleansing case associating a source instance of a data element having one or more associated attribute values with a target instance of a data element;
  send to a second computer system a blocking message that identifies the cleansing case and indicates access to the cleansing case from the second computer system is to be blocked;
  permit a first user at the first computer system to process the cleansing case by permitting the first user to identify one or more attribute values associated with the source instance that are to be associated with the target instance, and associate the identified attribute values with the target instance;
  after the first user processes the cleansing case, send to the second computer system a cleansing-result message that identifies the cleansing case and indicates access to the cleansing case from the second computer system is to be permitted; and
  only after receipt of the cleansing-result message at the second computer system, permit a second user at the second computer system to process the cleansing case by permitting the second user to identify one or more attribute values associated with the source instance that are to be associated with the target instance, and associate the identified attribute values with the target instance.

18. The system of claim 17 wherein the processor is further configured to process the cleansing case by:
  displaying the source instance associated with the cleansing case, and
  displaying the target instance associated with the cleansing case.

19. The system of claim 17 wherein the first user is the same user as the second user.

20. The system of claim 17 wherein receiving a cleansing case comprises receiving a source identification key for the source instance and a target identification key for the target instance and the processor is further configured to process a cleansing by:
  using the source identification key to access source data structure information identifying one or more data elements relating to the source instance and one or more attribute values associated with the source instance; and using the target identification key to access target data structure information identifying one or more data elements relating to the target instance and one or more attribute values associated with the target instance.

21. The system of claim 17 wherein processor is further configured to process a cleansing case by displaying an indication as to whether the attribute value associated with the source instance is identical to a corresponding attribute value associated with the target instance.

22. The system of claim 17 wherein a source instance comprises one or more subcomponents, with each subcomponent having one or more associated attribute values, and the processor is further configured to process the cleansing case by:

displaying a subcomponent of the source instance;
receiving an indication that the displayed subcomponent of the source instance is to be associated with the target instance; and
associating the identified subcomponent with the target instance.

23. The system of claim 22, wherein a target instance comprises one or more subcomponents, with each subcomponent having one or more associated attribute values, and the processor is further configured to process the cleansing case by:

displaying at least one attribute value associated with the subcomponent of the source instance and at least one attribute value associated with the subcomponent of the target instance;
receiving an indication that identifies at least one attribute value associated with the subcomponent of the source instance that is to be associated with the subcomponent of the target instance; and
associating the identified attribute values with the subcomponent of the target instance.

24. The system of claim 17, wherein the processor is further configured to:

associate a target list with at least one source instance and at least one target instance;
display identifying information for each source instance and each target instance associated with the target list; and
receive an indication that identifies a source instance and a target instance to be displayed.

25. A computer-implemented method for maintaining data, the method comprising:

at a first computer system, receiving a cleansing case associating a source instance of a data element having one or more subcomponents, with each subcomponent having one or more associated attribute values, with a target instance of a data element having one or more subcomponents, with each subcomponent having one or more associated attribute values;
permitting a first user at the first computer system to process the cleansing case by permitting the first user to:

display at least one attribute value associated with a subcomponent of the source instance and at least one attribute value associated with a subcomponent of the target instance,
receive an indication that identifies at least one attribute value associated with the subcomponent of the source instance that is to be associated with the subcomponent of the target instance, and
associate the identified attribute values with the subcomponent of the target instance; and
after the first user processes the cleansing case, permitting a second user at a second computer system to process the cleansing case by permitting the second user to:
display at least one attribute value associated with a subcomponent of the source instance and at least one attribute value associated with a subcomponent of the target instance,
receive an indication that identifies at least one attribute value associated with the subcomponent of the source instance that is to be associated with the subcomponent of the target instance, and
associate the identified attribute values with the subcomponent of the target instance.

26. A computer-readable storage medium having embodied thereon a computer program configured to maintain data, the medium comprising one or more code segments configured to, when executed:

receive, at a first computer system, a cleansing case associating a source instance of a data element having one or more associated attribute values with a target instance of a data element;
permit a first user at the first computer system to process the cleansing case by permitting the first user:
display at least one attribute value associated with a subcomponent of the source instance and at least one attribute value associated with a subcomponent of the target instance,
receive an indication that identifies at least one attribute value associated with the subcomponent of the source instance that is to be associated with the subcomponent of the target instance, and
associate the identified attribute values with the subcomponent of the target instance; and
after the first user processes the cleansing case, permit a second user at a second computer system to process the cleansing case by permitting the second user to:
display at least one attribute value associated with a subcomponent of the source instance and at least one attribute value associated with a subcomponent of the target instance,
receive an indication that identifies at least one attribute value associated with the subcomponent of the source instance that is to be associated with the subcomponent of the target instance, and
associate the identified attribute values with the subcomponent of the target instance.

* * * * *